US008462042B2

(12) United States Patent
DeLong et al.

(10) Patent No.: US 8,462,042 B2
(45) Date of Patent: Jun. 11, 2013

(54) GENERATING A KINEMATIC INDICATOR FOR COMBAT IDENTIFICATION CLASSIFICATION

(75) Inventors: Richard P. DeLong, Anoka, MN (US); Barbara J. Blyth, Ellington, CT (US)

(73) Assignee: Raytheon Company, Waltham, MA (US)

( * ) Notice: Subject to any disclaimer, the term of this patent is extended or adjusted under 35 U.S.C. 154(b) by 987 days.

(21) Appl. No.: 12/510,748

(22) Filed: Jul. 28, 2009

(65) Prior Publication Data

US 2011/0029242 A1 Feb. 3, 2011

(51) Int. Cl.
*G01S 13/78* (2006.01)
(52) U.S. Cl.
USPC .................. 342/45; 342/42; 342/90; 342/114
(58) Field of Classification Search
USPC ............................ 342/42, 44, 45, 95–97, 114
See application file for complete search history.

(56) References Cited

U.S. PATENT DOCUMENTS

| 6,437,727 | B2  |   | 8/2002  | Lemelson et al. ............... 342/45 |
|-----------|-----|---|---------|---------------------------------------|
| 7,026,979 | B2  |   | 4/2006  | Khosla ............................ 342/90 |
| 7,286,213 | B2  | * | 10/2007 | Bredy ........................ 356/141.1 |
| 7,394,046 | B2  | * | 7/2008  | Olsson et al. .................. 244/3.1 |
| 8,085,186 | B1  | * | 12/2011 | Malakian et al. ............... 342/95 |
| 8,138,965 | B1  | * | 3/2012  | Luu et al. ........................ 342/90 |
| 8,149,156 | B1  | * | 4/2012  | Allred et al. .................... 342/52 |
| 2005/0001759 | A1 | * | 1/2005  | Khosla ............................ 342/90 |
| 2005/0012657 | A1 | * | 1/2005  | Mohan .......................... 342/133 |
| 2005/0254712 | A1 | * | 11/2005 | Lindeman ..................... 382/224 |
| 2007/0253625 | A1 | * | 11/2007 | Yi .................................. 382/228 |

\* cited by examiner

*Primary Examiner* — John B. Sotomayor
*Assistant Examiner* — Marcus Windrich
(74) *Attorney, Agent, or Firm* — Schwegman Lundberg & Woessner, P.A.

(57) ABSTRACT

In accordance with a particular embodiment of the invention, a kinematic indicator generator may receive tracking data describing the position and velocity of a target. The tracking data may be used to identify an event describing an action of the target that may have occurred. The probability that the event occurred may be calculated and indicated by a confidence. The kinematic indicator generator may generate a kinematic indicator that includes the event and the confidence.

24 Claims, 2 Drawing Sheets

GENERATING A KINEMATIC INDICATOR FOR COMBAT IDENTIFICATION CLASSIFICATION

TECHNICAL FIELD

The present disclosure relates generally to tracking a target, and more specifically to generating a kinematic indicator for combat identification classification.

BACKGROUND

Combat identification classification (CID) systems may collect data about a target to identify characteristics of the target. The data available to a CID system, however, may be insufficient to accurately identify the characteristics of the target.

SUMMARY OF EXAMPLE EMBODIMENTS

In accordance with a particular embodiment of the invention, a kinematic indicator generator may receive tracking data describing the position and velocity of a target. The tracking data may be used to identify an event describing an action of the target that may have occurred. The probability that the event occurred may be calculated and indicated by a confidence. The kinematic indicator generator may generate a kinematic indicator that includes the event and the confidence.

Certain embodiments of the invention may provide one or more technical advantages. A technical advantage of one embodiment may be that a kinematic indicator describing an action of a target may include other information describing the target. As an example, a kinematic indicator may include a confidence that indicates the probability that a kinematic event is occurring. Thus, the kinematic indicator may aid a Combat identification classification (CID) system in evaluating the importance of the kinematic event relative to other types of information.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

Figure 1:
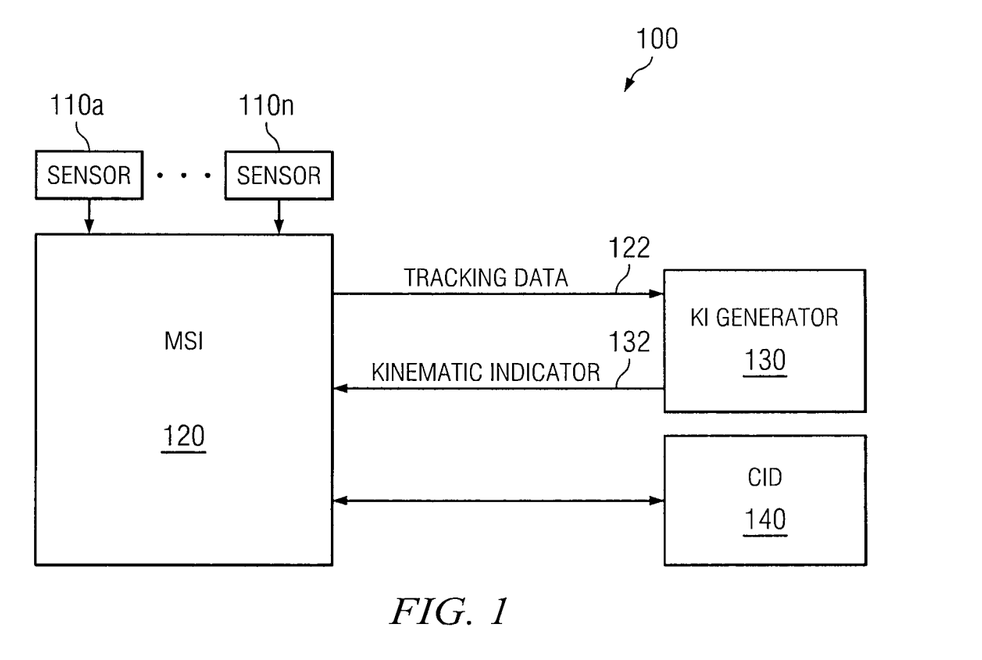
FIG. 1 is a block diagram illustrating an example of a system that may utilize a kinematic indicator, according to some embodiments.
Figure 2:
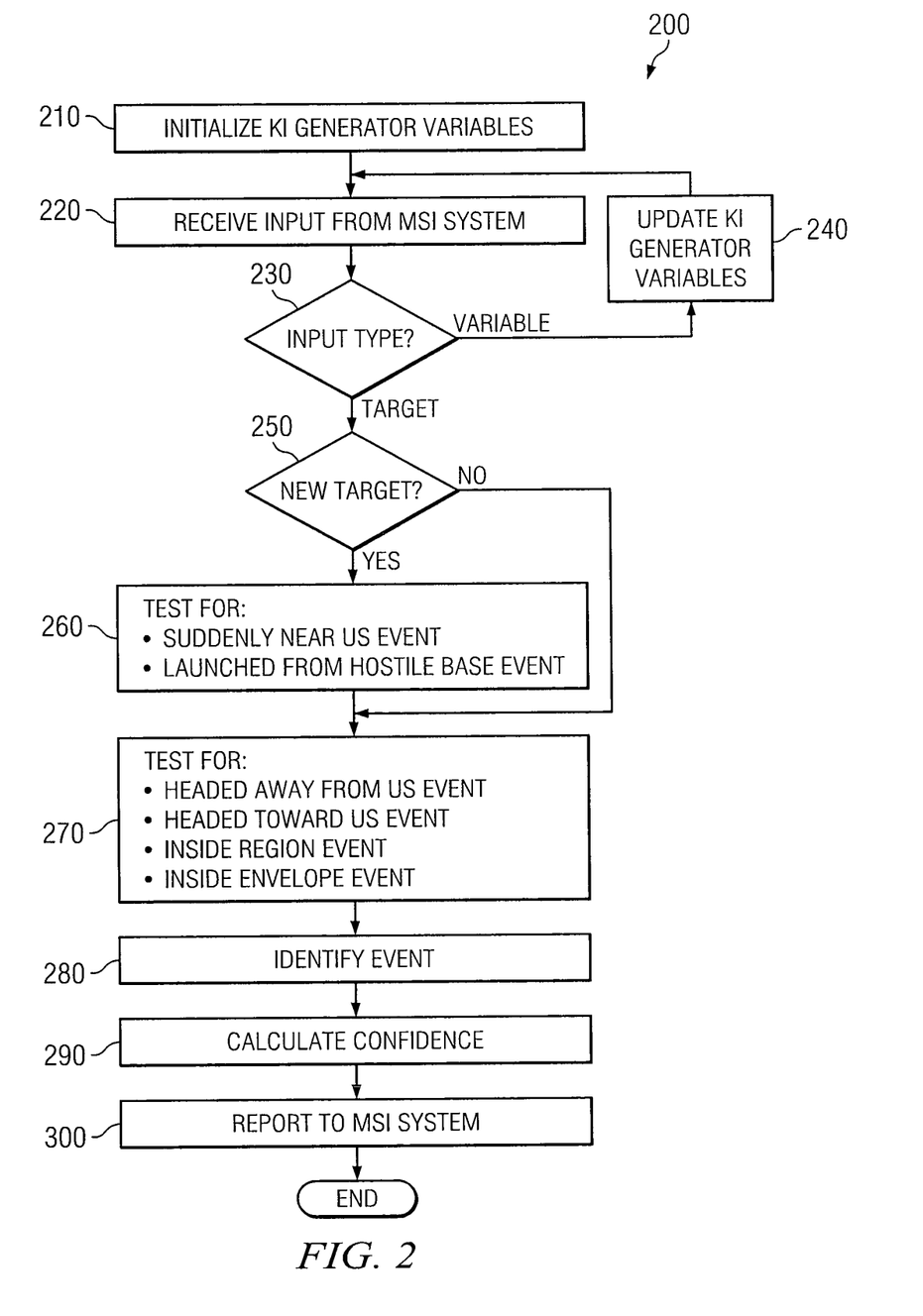
FIG. 2 is a flow diagram illustrating an example of a method that may be used to generate a kinematic indicator, according to some embodiments.

Embodiments of the present invention and its advantages are best understood by referring to FIGS. 1 and 2 of the drawings, like numerals being used for like and corresponding parts of the various drawings.

FIG. 1 is a block diagram illustrating an example of a system 100 that may utilize a kinematic indicator. According to some embodiments, system 100 may comprise sensors 110, a multi-sensor integration (MSI) system 120, a kinematic indicator (KI) generator 130, and a combat identification classification (CID) module 140.

In some embodiments, system 100 may be a CID system. A CID system may identify characteristics of a target. A target may be a physical object such as a passenger airplane, a fighter jet, a ship, an armored personnel carrier, or a remotely piloted vehicle (RPV). The characteristics may indicate the nationality, allegiance, type of vehicle, and/or any other feature suitable for determining whether the target is a friend or an enemy. A decision maker may use these characteristics to make tactical decisions. For example, if the characteristics indicate that an aircraft is friendly, then the decision maker may decide against firing at the aircraft.

CID systems may use data from several sources to make an identification. The data may be fused together to generate a composite description of the target. In general, the more information that is available to the CID system, the higher the likelihood that the system will make an accurate identification. In some embodiments, kinematic behavior may be fused with other evidence. Fusing kinematic behavior with other evidence may improve the system's ability to identify whether a target is a friend or an enemy.

In some embodiments, the sensors 110 of the system 100 may collect sensor data for a target, such as an aircraft flying through an airspace monitored by the sensors 110. The sensor data may comprise any suitable type of data. For example, the sensor data may comprise kinematic data and/or attribute data describing the target. Kinematic data may include any data suitable for determining the position, velocity, and/or acceleration of the target. Attribute data may describe a property of the target, and it may be obtained using cooperative target recognition and/or non-cooperative target recognition (NCTR) techniques. Cooperative target recognition techniques may apply to targets that aid in the identification process, such as a target that sends "identification friend or foe" (IFF) signals indicating that it is friendly. NCTR techniques may apply to targets that do not aid in the identification process. Examples of data used in NCTR techniques may include electronic warfare support data describing the pulse, repetition, and frequency of the target's radar; radar signal modulation data describing the rotation of an engine or other part of the target; and/or infrared sensor data describing the heat, color, and other characteristics of the target's plume.

In some embodiments, the sensors 110 may send the sensor data to the MSI system 120 to be processed. The sensor data may be sent directly or indirectly. For example, in some embodiments the sensors 110 may send the sensor data to an information network, such as the Cooperative Engagement Capability's (CEC) Data Distribution System (DDS) network, a Link 16 Surveillance network, or a Precise Position Location and Information (PPLI) network to be passed to the MSI system 120.

In some embodiments, the MSI system 120 may generate tracking data 122 that may be used to identify a target or describe the target's environment. The tracking data 122 may be generated from data received from the sensors 110 and/or a user interface. The MSI system 120 may be any suitable system for processing sensor data, such as a Commercial Off-The-Shelf (COTS) system. A user of the MSI system 120 may be referred to as "us," as opposed to "them." In some embodiments, a user may be a military organization, such as the United States Armed Forces, or any subdivision thereof. For example, a subdivision of a military organization may be a unit comprising members. The members may be soldiers or property belonging to the unit. Property of the unit may include goods, such as vehicles, including ships and aircraft, or real property, such as a military base. A target may be moving relative to a unit. As an example, a target may be moving toward the aircraft of a unit or away from the aircraft of a unit.

The tracking data 122 may include a position, an altitude, and a velocity of a target. The tracking data 122 may further include a covariance measuring the degree to which the position, altitude, and/or velocity change together. In some embodiments, the position may be measured in latitude and longitude, the altitude may be measured in feet or meters, and the velocity may be measured in miles or kilometers per hour in east/north coordinates. The tracking data 122 may also include values for environmental variables that may be used to provide context for the environment through which the target moves. Examples of such data include the location of a hostile base, the boundaries of a region of interest, the characteristics of an envelope of interest, and/or the positions of force members associated with the user of the MSI system 120.

In some embodiments, the KI generator 130 may generate a kinematic indicator 132 from tracking data 122 received from the MSI system 120. The kinematic indicator 132 includes an event and a confidence. The event describes an action of the target. Examples of events include a Suddenly Near Us event, a Launched From Hostile Base event, a Headed Away From Us event, a Headed Toward Us event, an Inside Region event, and/or an Inside Envelope event. In some embodiments, the KI generator 130 may label each event with a serial number to distinguish it from other events. The confidence indicates the probability that the event occurred. For example, the confidence may range from zero to one, where a higher confidence indicates a higher probability that the event occurred. The KI generator 130 may send the kinematic indicator 132 comprising the event, the confidence, and/or the serial number to the MSI system 120.

In some embodiments, the MSI system 120 may fuse the kinematic indicator 132 from the KI generator 130 with other evidence, such as attribute evidence, to form a composite track that includes the different types of information. The MSI system 120 may perform three levels of data fusion. The first level of fusion may determine the relationships among the data collected by sensors 110. The sensor data may be partitioned into subsets that are believed to originate from the same target. The partitioned data for a target may be filtered to estimate the target's course and speed. The partitioned data and the resulting estimates are called tracks. The first level of fusion may also partition sensor data describing environmental variables. For example, the sensor data may be partitioned into data that describes geographic boundaries, air corridors, and no-fly zones. Additionally, environmental variables may describe conditions, such as barometric pressure, humidity, or the location of the cloud ceiling.

The second level of fusion performed by the MSI system 120 may determine the relationships among the first level target tracks and/or the first level environmental variables, such as "track 1 is attacking track 2," "track 1 and track 4 belong to the same unit," "track 2 is flying in air corridor 5," or "track 4 is flying above the clouds."

The third level of fusion determines the relationships that exist among the second level relationships, such as "Track 4 is flying above the clouds because it is supporting track 1's attack, and this is a recognized tactic of that unit." Thus, the third level of fusion may be used to estimate the intent of the target. The third level of fusion may systematically discretize the relationships determined by the second level of fusion into "events." An event may capture evidence about a target's identity from its location, velocity, and surrounding environment. For example, a target flying low and fast toward a ship in company is probably hostile. A target originating from a known airport and remaining within commercial air corridors is likely neutral. In some embodiments, higher levels of fusion may account for the possibility of errors at the lower levels of fusion to estimate correctly despite those errors.

The MSI system 120 may fuse new and updated kinematic indicators 132 and/or other evidence to the composite track as they are received. The kinematic indicators 132 and/or other evidence received by the MSI system 120 may arrive asynchronously. For example, the number of attribute samples may be greater than or less than the number of kinematic samples. The MSI system 120 may be configured to select a portion of the samples to use in the composite track to compensate for the asynchronous arrival rates. In some embodiments, the MSI system 120 may collect attribute samples and kinematic samples over a time interval. During the time interval, the number of kinematic samples may be less than or greater than the amount of attribute samples. If the number of kinematic samples is less than the number of attribute samples, the MSI system 120 may select a number of attribute samples, where the number is substantially equal to the number of kinematic samples. If the number of kinematic samples is greater than the number of attribute samples, the MSI system 120 may select a number of kinematic samples, where the number is substantially equal to the number of attribute samples. The samples may be selected in any suitable manner. For example, the samples may be selected periodically based on a sub-interval of the time interval. In some embodiments, the MSI system 120 may send the composite track to the CID module 140.

In some embodiments, the CID module 140 may identify characteristics of the target based on the composite track. For example, the CID module 140 may identify the nationality, allegiance, intent, or type of the target vehicle. The characteristics may aid a user in determining whether the target is friendly or hostile.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic comprising software, hardware, and/or other logic. As used in this document, "each" refers to each member of a set or each member of a subset of a set.

FIG. 2 is a flow diagram illustrating an example of a method 200 that may be used to generate a kinematic indicator. The method begins at step 210, where a KI generator, such as the KI generator 130 of FIG. 1, is initialized. During initialization, the KI generator may receive values for environmental variables, such as the location of a hostile base, the boundaries of a region of interest, the characteristics of an envelope of interest, and/or the positions of force members.

At step 220, the KI generator may receive tracking data from an MSI system, such as the MSI system 130 of FIG. 1. The tracking data may include values for environmental variables or it may describe a target.

At step 230, the KI generator may determine if the tracking data includes values for environmental variables or describes a target. If the tracking data includes values for environmental variables, the method proceeds to step 240.

In some embodiments, the KI generator updates the environmental variables according to the tracking data at step 240. For example, the tracking data may indicate that a force member, such as an aircraft belonging to "us," moved to a different position. As another example, the tracking data may indicate that a user has selected a new origin for the system. The KI generator may update the geospatial coordinates of the environmental variables based on the numbering convention of the new origin. The method then returns to step 220, where the KI generator receives the next input from the MSI system.

If the tracking data describes the target at step 230, the method proceeds to step 250. At step 250, the KI generator may determine whether the target is a new target for which tracking data has not been previously received. If the target is a new target, the method proceeds to step 260. At step 260, the KI generator may test for a Suddenly Near Us event and/or a Launched From Hostile Base.

In some embodiments, the Suddenly Near Us event may be determined by the position of the target relative to the position of a force member. The test result may be positive if the target is very close to a force member when it is first detected by a sensor. The sudden appearance of a target may indicate that the target is an enemy.

In some embodiments, the Launched From Hostile Base event may be determined by the position and/or velocity of the target relative to a hostile base. The test result may be positive if the target is near a hostile base when it is first detected by a sensor. A launch from a hostile base may indicate that the target is an enemy.

Upon completion of step 260, or upon a determination that the target is not new in step 250, the method proceeds to step 270. At step 270, the KI generator may test for a Headed Away From Us event, a Headed Toward Us event, an Inside Region event, and/or an Inside Envelope event.

In some embodiments, the Headed Away From Us event may be determined by the position and/or velocity of the target relative to the position of a member of a unit. The test result may be positive if the target is moving in away from the member and is a great distance from the member. A target flying away from a member may be friendly or neutral.

In some embodiments, the Headed Toward Us event may be determined by the position and/or velocity of the target relative to the position of a member of a unit. The test result may be positive if the target is moving in the direction of the member and is close to the member. A target flying toward a member may be an enemy.

In some embodiments, the Inside Region event may indicate the probability that a target is located within region such as a safe corridor or a no-fly zone. The test result may be positive if the region is a candidate in which the target might be located. A target flying in certain regions, such as no-fly zones, may be an enemy.

In some embodiments, the Inside Envelope event may indicate the probability that a target is located within an envelope such as a military performance envelope. An envelope may comprise speed and altitude performance characteristics that correspond to particular types of aircraft. For example, a military performance envelope may be defined by a high altitude and a fast speed. The test result may be positive if the envelope is a candidate in which the target might be located. A target flying in certain envelopes, such as military performance envelopes, may be an enemy.

At step 280, the KI generator identifies the events to be reported to the MSI system. For example, the KI generator may identify the events from step 260 and/or step 270 that probably occurred. In some embodiments, the KI generator may identify more than one event of the same type. For example, the KI generator may identify two different candidate regions in which the target might be located according to the Inside Region event test.

At step 290, the KI generator calculates confidences for the events identified in step 280. A confidence may indicate the probability that an event actually occurred. In some embodiments, the steps of identifying an event and calculating a confidence may be executed in one computation. For example, the computation may determine the confidence for an event. If the confidence for the event exceeds a threshold, then the event may be identified. In some embodiments, the steps of identifying an event and calculating a confidence may be executed in more than one computation. For example, a coarse determination may be used to identify the event, and a fine determination may be used to calculate the confidence. This approach may be desirable for resource-intensive confidence calculations, such as calculations that require a large amount of time or processor memory.

In some embodiments, the confidence for the Suddenly Near Us event may describe the distance between the target and a member of a unit. The confidence may be calculated according to an exponential that decays with distance. As the target moves closer to the member, the distance decreases, causing the confidence to increase.

In some embodiments, the confidence for the Launched From Hostile Base event may be calculated from a cosine of the angle between the outbound velocity vector of the target and the radius vector from the base position, multiplied by a decreasing exponential of the distance between the hostile base and the target. The confidence may be increase when the target is aligned with a runway of the hostile base. In some embodiments, the confidence for the Launched From Hostile Base event may be calculated from the distance between the base and the target. The confidence may increase when the target is within a certain distance of the base, such as 5 nautical miles. In some embodiments, the confidence for the Launched From Hostile Base event may be calculated from the distance between the base and the target and the velocity of the target. For example, the confidence may increase when the target is located near a hostile base and the velocity indicates that the target has recently been launched, such as when the target is in an upward climb.

In some embodiments, the confidence for the Headed Away From Us event may be calculated from a cosine representing the dot product of the position of the member relative to the position of the target and the target's velocity, divided by the distance between the member and the target and the target's speed. The confidence may increase when the target is moving directly away from the member. The target may be moving directly away from the member when the alignment of a velocity vector of the target and a vector from the member to the target coincide. In some embodiments, a unit may comprise a plurality of members. The confidence corresponding to the Headed Away From Us event may be determined by evaluating the tracking data of the target against the position of each member of the unit. In some embodiments, the confidence may be high only if the target is flying away from every member of the unit. For example, the confidence may be the average of the members' confidences.

In some embodiments, the confidence for the Headed Toward Us event may be calculated according to an exponential that decays with the distance between the target and the closest point of approach to the member, divided by target's speed. As the target moves faster and is aimed nearer to the member, the minimum time for the target to reach the member (the characteristic time) decreases. A decrease in the characteristic time may cause the confidence to increase. In some embodiments, a unit may comprise a plurality of members. The confidence corresponding to the Headed Toward Us event may be determined by evaluating the tracking data of the target against the position of each member of the unit. In some embodiments, the confidence may be high if the target is flying toward any member of the unit.

In some embodiments, the confidence for an Inside Region event may be calculated according to an integral of a probability density function over the region. The region received by the KI generator upon initialization may be three-dimensional. For example, the region may comprise a plurality of vertices, in latitude and longitude coordinates, connected by lines that form polygonal geodesics. In some embodiments, calculating the confidence may be simplified by converting the region into a two-dimensional form. For example, the KI generator may convert the vertices to genomic form to obtain a two-dimensional region defined by a boundary. Because the differential 2-form, such as a probability density function on a plane, is closed (i.e., its differential is zero), it can be expressed as the differential of a 1-form. Using the theorem that "the integral over a region of a 1-form's differential is the integral of the 1-form over the boundary of the region," as expressed in the formula:

$$\int_R d\alpha = \int_{\partial R} \alpha,$$

may allow the differential 2-form $d\alpha$ to represent a Gaussian probability density function in the plane:

$$d\alpha = \frac{\sqrt{\det G}}{2\pi} e^{-\frac{1}{2}(xy)G\binom{x}{y}} dx \wedge dy,$$

where G is a 2×2 positive-definite matrix. The corresponding 1-form $\alpha$ can be calculated as:

$$\alpha = \frac{\sqrt{\det G}}{2\pi} \left(1 - e^{-\frac{1}{2}(xy)G\binom{x}{y}}\right) \frac{xdy - ydx}{(xy)G\binom{x}{y}},$$

which can be thought of as a generalization to two dimensions of the "cumulative probability distribution" for the Gaussian.

By integrating the 1-form $\alpha$ around the boundary of the region, the amount of the probability contained in the region is calculated. If the probability density function $d\alpha$ represents an estimate of target position, then the calculated confidence represents the probability that the target lies within the region. In some embodiments, the integrals are calculated using Gauss-Chebyshev methods. In some embodiments, the calculations may be generalized for regions of higher than two dimensions.

In some embodiments, the region being evaluated may be a union of polygons, not necessarily connected or convex. The region may be subdivided into quadrilaterals, which may be convex, and the integrals may be taken for each quadrilateral. The integrals over each of the quadrilaterals may be summed to get the integral over the whole region. While the calculation may be performed directly on a polygonal region, dividing the region into convex quadrilaterals may prevent errors in environmental data, at the expense of increased computation time for the confidence calculation. For example, building the region out of quadrilaterals may require that the vertices are in counter-clockwise order so that boundary integrals of one quadrilateral cancel the boundary integrals of adjacent quadrilaterals.

In some embodiments, the altitude of the target may be calculated independent of the latitude and the longitude. For example, if an air corridor has constant lower and upper altitude limits, then an estimate may determine the degree to which a reported altitude is within those limits. The estimate may be calculated according to the one-dimensional integral of the altitude probability density between the lower and upper altitude limits.

In some embodiments, the Inside Region event may be tested for a plurality of candidate regions in which the target might be located. For example, the KI generator may have identified two Inside Region events in step 290. The two Inside Region events may indicate two different regions in which the target might be located. A confidence may be generated for each Inside Region event. If the confidence of the first Inside Region event is higher than the confidence of the second Inside Region event, then it may be more probable that the target is located within the first region. Regions may be either overlapping or disjoint. The confidences for disjoint regions for a single target may sum to less than one. That is, as the confidence that a target is in one region increases, the confidence that the target is in a disjoint region may decrease. By contrast, the confidences of overlapping regions for a single target may each approach one. If the confidences for overlapping regions each approach one, it may indicate the target is probably in the overlapping portion of the regions.

In some embodiments, the confidence for an Inside Envelope event may be determined by a probability integral similar to that used in the confidence calculation for the Inside Region event. For example, the integration may be performed along the two-dimensional boundary defined by the altitude and speed of the envelope. The positive-definite matrix reflects uncertainty in the target's altitude and speed. The uncertainty is analogous to the uncertainty about the target's genomic position for the Inside Region event. In some embodiments, the confidence may be calculated for a plurality of candidate envelopes in which the target might be located. Each envelope may be characteristic of a certain class of aircraft. A separate Inside Envelope event may be identified for each envelope.

At step 300, the KI generator reports a kinematic indicator to the MSI system. The kinematic indicator includes the event and the confidence. In some embodiments, the kinematic indicator may include a serial number to distinguish a particular event from other events. The method then ends.

Modifications, additions, or omissions may be made to the method without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A method comprising:
    receiving tracking data at a kinematic indicator generator, the tracking data comprising a position and a velocity of a target;
    identifying an event according to the tracking data, the event describing an action of the target related to a change in target location;
    calculating a confidence of the event, the confidence indicating the probability that the event occurred;
    generating a kinematic indicator for the target, the kinematic indicator comprising the event and the confidence; and providing the kinematic indicator to a multi-sensor integration (MSI) system.

2. The method of claim 1:
the tracking data further comprising a location of a hostile base;
the identifying the event further comprising:
   determining that the target is moving away from the hostile base; and
   identifying the event as a Launched from Hostile Base event; and
the calculating the confidence further comprising:
   determining the confidence according to the position of the target relative to the location of the hostile base.

3. The method of claim 1:
the tracking data further comprising a location of a member of a unit;
the identifying the event further comprising:
   determining that the target is near the location of the member; and
   identifying the event as a Suddenly Near Us event; and
the calculating the confidence further comprising:
   determining the confidence according to the position of the target relative to the location of the member.

4. The method of claim 1:
the tracking data further comprising a location of a member of a unit;
the identifying the event further comprising:
   determining that the target is moving toward the member; and
   identifying the event as a Headed Toward Us event; and
the calculating the confidence further comprising:
   determining the confidence according to the velocity of the target and a transverse distance between the target trajectory and the member, the confidence increasing as the distance decreases or the speed increases.

5. The method of claim 1:
the tracking data further comprising a location of a member of a unit;
the identifying the event further comprising:
   determining that the target is moving away from the member; and
   identifying the event as a Headed Away From Us event; and
the calculating the confidence further comprising:
   determining the confidence according to a velocity vector of the target and a vector from the member to the target, the confidence increasing as the alignment of the vectors coincides.

6. The method of claim 1:
the tracking data further comprising a plurality of vertices describing a polygonal geodesic region, each vertex comprising a latitude coordinate and a longitude coordinate; the identifying the event further comprising:
   determining that the polygonal geodesic region is a candidate region in which the target might be located;
   identifying the event as an Inside Region event; and
the calculating the confidence further comprising:
   determining the confidence according to a probability integral.

7. The method of claim 1:
the tracking data further comprising a plurality of vertices describing a polygonal geodesic region; and
the calculating the confidence further comprising:
   converting the plurality of vertices to a gnomonic form to yield a two-dimensional region defined by a boundary;
   obtaining a probability integral of a 1-form over the boundary of the two-dimensional region; and
   calculating the confidence from the probability integral.

8. A method comprising:
receiving tracking data at a kinematic indicator generator, the tracking data comprising a position and a velocity of a target;
identifying an event according to the tracking data, the event describing an action of the target;
calculating a confidence of the event, the confidence indicating the probability that the event occurred; and
generating a kinematic indicator for the target, the kinematic indicator comprising the event and the confidence,
wherein the tracking data further comprises an envelope describing a region of altitude and speed, the envelope corresponding to a performance characteristic of an aircraft;
wherein identifying the event further comprises:
determining that the envelope is a candidate envelope in which the target might be performing; and
identifying the event as an Inside Envelope event, and
wherein calculating the confidence further comprises:
determining the confidence according to a probability integral.

9. A method comprising:
receiving tracking data at a kinematic indicator generator, the tracking data comprising a position and a velocity of a target;
identifying an event according to the tracking data, the event describing an action of the target;
calculating a confidence of the event, the confidence indicating the probability that the event occurred; and
generating a kinematic indicator for the target, the kinematic indicator comprising the event and the confidence,
wherein the tracking data further comprising an envelope describing a two-dimensional region of altitude and speed, the envelope corresponding to a performance characteristic of an aircraft; and
wherein calculating the confidence further comprises:
   obtaining a probability integral of a 1-form over the boundary of the two-dimensional region; and
   calculating the confidence from the probability integral.

10. The method of claim 1, further comprising:
collecting a first set of tracking data over a time interval, the first set of tracking data comprising a number of attribute samples;
collecting a second set of tracking data over the time interval, the second set of tracking data comprising a number of kinematic samples, the number of kinematic samples being greater than the number of attribute samples; and
selecting a number of kinematic samples, the number of kinematic samples substantially equal to the number of attribute samples.

11. The method of claim 1, further comprising:
determining the target is a new target for which tracking data has not been previously received; and
identifying the event further comprising:
   identifying the event from a set of events comprising a Launched From Hostile Base event, a Suddenly Near Us event, a Headed Toward Us event, a Headed Away From Us, an Inside Region Event, and an Inside Envelope event.

12. The method of claim 1, further comprising:
determining tracking data has been previously received for the target; and identifying the event further comprising:
identifying the event from a set of events comprising a Headed Toward Us event, a Headed Away From Us, an Inside Region Event, and an Inside Envelope event.

13. An apparatus comprising:
an interface configured to:
receive tracking data at a kinematic indicator generator, the tracking data comprising a position and a velocity of a target; and
a processor configured to:
identify an event according to the tracking data, the event describing an action of the target related to a change in target location;
calculate a confidence of the event, the confidence indicating the probability that the event occurred; and
generate a kinematic indicator for the target, the kinematic indicator comprising the event and the confidence; and
provide the kinematic indicator to a multi-sensor integration (MSI) system.

14. The apparatus of claim 13:
the tracking data further comprising a location of a hostile base;
the processor configured to identify the event by:
determining that the target is moving away from the hostile base; and
identifying the event as a Launched from Hostile Base event; and
the processor configured to calculate the confidence by:
determining the confidence according to the position of the target relative to the location of the hostile base.

15. The apparatus of claim 13:
the tracking data further comprising a location of a member of a unit;
the processor configured to identify the event by:
determining that the target is near the location of the member; and
identifying the event as a Suddenly Near Us event; and
the processor configured to calculate the confidence by:
determining the confidence according to the position of the target relative to the location of the member.

16. The apparatus of claim 13:
the tracking data further comprising a location of a member of a unit;
the processor configured to identify the event by:
determining that the target is moving toward the member; and
identifying the event as a Headed Toward Us event; and
the processor configured to calculate the confidence by:
determining the confidence according to the velocity of the target and a transverse distance between the target trajectory and the member, the confidence increasing as the distance decreases or the speed increases.

17. The apparatus of claim 13:
the tracking data further comprising a location of a member of a unit;
the processor configured to identify the event by:
determining that the target is moving away from the member; and
identifying the event as a Headed Away From Us event; and
the processor configured to calculate the confidence by:
determining the confidence according to the velocity vector of the target and a vector from the member to the target, the confidence increasing as the alignment of the vectors coincides.

18. The apparatus of claim 13:
the tracking data further comprising a plurality of vertices describing a polygonal geodesic region, each vertex comprising a latitude coordinate and a longitude coordinate;
the processor configured to identify the event by:
determining that the polygonal geodesic region is a candidate region in which the target might be located;
identifying the event as an Inside Region event; and
the processor configured to calculate the confidence by:
determining the confidence according to a probability integral.

19. The apparatus of claim 13:
the tracking data further comprising a plurality of vertices describing a polygonal geodesic region; and
the processor configured to calculate the confidence by:
converting the plurality of vertices to a gnomonic form to yield a two-dimensional region defined by a boundary;
obtaining a probability integral of a 1-form over the boundary of the two-dimensional region; and
calculating the confidence from the probability integral.

20. An apparatus comprising:
an interface configured to:
receive tracking data at a kinematic indicator generator, the tracking data comprising a position and a velocity of a target; and
a processor configured to:
identify an event according to the tracking data, the event describing an action of the target;
calculate a confidence of the event, the confidence indicating the probability that the event occurred; and
generate a kinematic indicator for the tar et the kinematic indicator comprising the event and the confidence,
wherein the tracking data further comprises an envelope describing a region of altitude and speed, the envelope corresponding to a performance characteristic of an aircraft;
wherein the processor is configured to identify the event by:
determining that the envelope is a candidate envelope in which the target might be performing; and
identifying the event as an Inside Envelope event, and
wherein the processor is configured to calculate the confidence by:
determining the confidence according to a probability integral.

21. An apparatus comprising:
an interface configured to:
receive tracking data at a kinematic indicator generator, the tracking data comprising a position and a velocity of a target; and
a processor configured to:
identify an event according to the tracking data, the event describing an action of the target;
calculate a confidence of the event, the confidence indicating the probability that the event occurred; and
generate a kinematic indicator for the tar et the kinematic indicator comprising the event and the confidence,
wherein the tracking data further comprise an envelope describing a two-dimensional region of altitude and speed, the envelope corresponding to a performance characteristic of an aircraft;
wherein the processor is configured to calculate the confidence by:
obtaining a probability integral of a 1-form over the boundary of the two-dimensional region; and
calculating the confidence from the probability integral.

22. The apparatus of claim 13, further configured to:
collect a first set of tracking data over a time interval, the first set of tracking data comprising a number of attribute samples;
collect a second set of tracking data over the time interval, the second set of tracking data comprising a number of kinematic samples, the number of kinematic samples being greater than the number of attribute samples; and
select a number of kinematic samples, the number of kinematic samples substantially equal to the number of attribute samples.

23. The apparatus of claim 13, further configured to:
determine the target is a new target for which tracking data has not been previously received; and
the processor configured to identify the event by:
identifying the event from a set of events comprising a Launched From Hostile Base event, a Suddenly Near Us event, a Headed Toward Us event, a Headed Away From Us, an Inside Region Event, and an Inside Envelope event.

24. The apparatus of claim 13, further configured to:
determine tracking data has been previously received for the target; and
the processor configured to identify the event by:
identifying the event from a set of events comprising a Headed Toward Us event, a Headed Away From Us, an Inside Region Event, and an Inside Envelope event.

* * * * *

UNITED STATES PATENT AND TRADEMARK OFFICE
CERTIFICATE OF CORRECTION

PATENT NO. : 8,462,042 B2
APPLICATION NO. : 12/510748
DATED : June 11, 2013
INVENTOR(S) : DeLong et al.

Page 1 of 1

It is certified that error appears in the above-identified patent and that said Letters Patent is hereby corrected as shown below:

In the Specification

In column 4, line 57, before "MSI", delete "an", therefor

In column 5, line 2, delete "a" and insert --an--, therefor

In column 5, line 35, after "moving", delete "in", therefor

In column 5, line 36, after "is", insert --at--, therefor

In column 7, line 13, delete "genomic" and insert --gnomonic--, therefor

In column 8, line 32, delete "genomic" and insert --gnomonic--, therefor

In the Claims

In column 9, line 53-54, in Claim 6, after "coordinate;", insert --¶--, therefor In column 11, line 16, in Claim 13, after "occurred;", delete "and", therefor In column 12, line 32, in Claim 20, delete "tar et" and insert --target,--, therefor In column 12, line 57, in Claim 21, delete "tar et" and insert --target,--, therefor Signed and Sealed this
Twelfth Day of November, 2013

Teresa Stanek Rea
*Deputy Director of the United States Patent and Trademark Office*